UNITED STATES PATENT OFFICE.

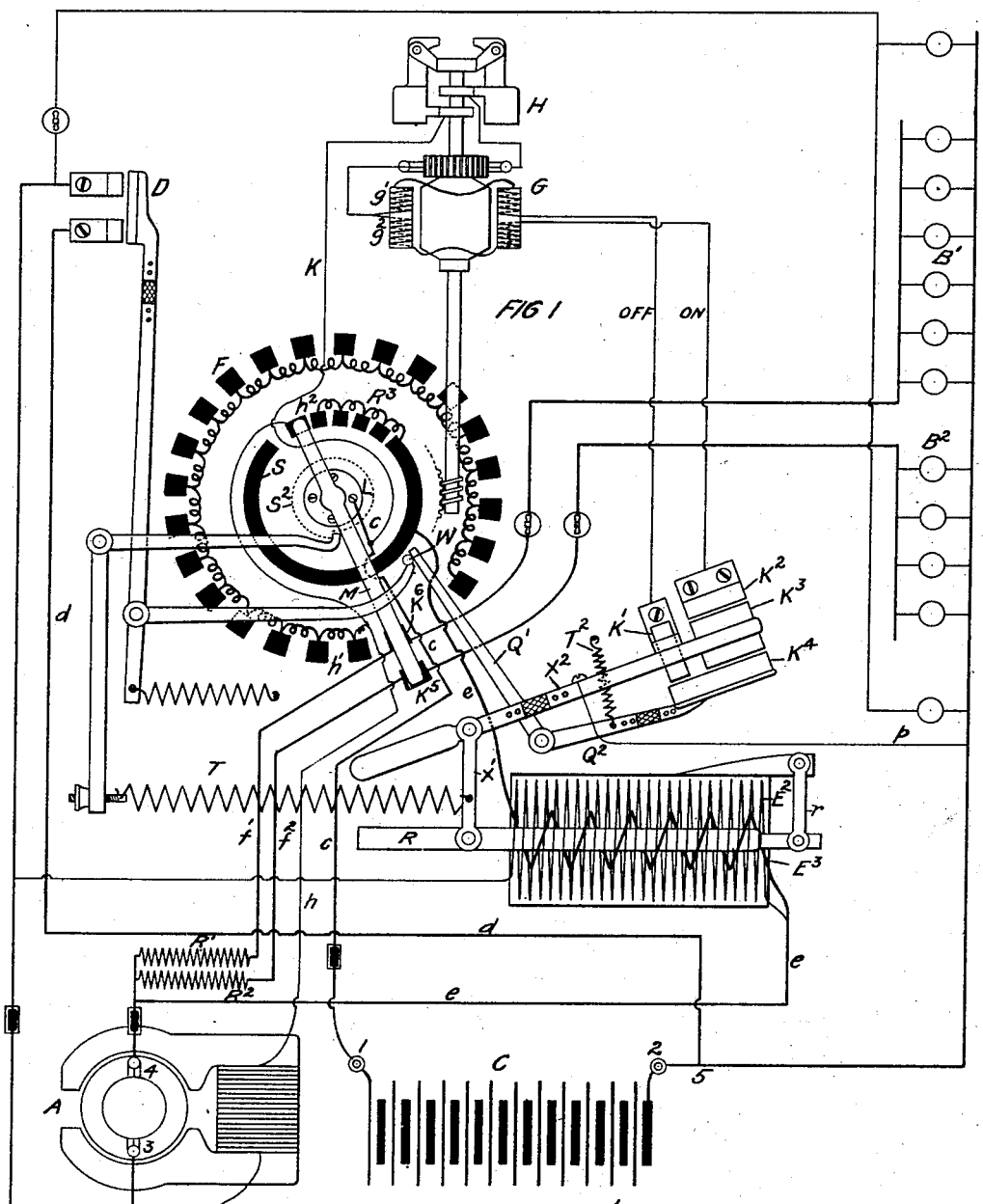

JAMES F. McELROY, OF ALBANY, NEW YORK.

ELECTRIC-LIGHTING SYSTEM.

SPECIFICATION forming part of Letters Patent No. 720,610, dated February 17, 1903.

Application filed February 19, 1902. Renewed October 23, 1902. Serial No. 128,504. (No model.)

*To all whom it may concern:*

Be it known that I, JAMES F. MCELROY, a citizen of the United States, residing at Albany, county of Albany, and State of New York, have invented certain new and useful Improvements in Electric-Lighting Systems, of which the following is a specification, reference being made to the accompanying drawings, which show in diagram, in—

Figure 1, one of the various forms in which the invention may be embodied. Figs. 2 and 3 are elementary diagrams.

In a system of electric lighting heretofore devised by me and adapted particularly for the lighting of railway-cars from a car-axle I have provided that the dynamo, operated more or less intermittently and at a variable speed, should be connected to the circuit when the attained speed should be sufficient to develop a specified electromotive force. The circuit to which the dynamo is thus connected contains both electric lamps and a storage battery connected in multiple, the dynamo being designed to operate the lamps and at the same time charge the battery, so that when it is disconnected from the circuit the battery may operate the lamps. In the system aforesaid I have also provided that the dynamo should be connected to the circuit with no resistance between it and the lamps when its potential reached a point suitable for operating the lamps and that after such connection its potential should be gradually raised to a higher point suitable for charging the battery and simultaneous therewith a resistance be introduced into the lamp-circuit to avoid any increase of potential at the lamps. This arrangement was due to the fact that a higher potential is required to charge the battery than it is expedient to apply directly to the lamps, assuming that the battery is to be charged up to a point where it will satisfactorily operate the lamps when the dynamo is disconnected.

In my present invention I provide that while the battery is still operating the lamps the dynamo shall be connected to the lamp and battery-circuit with the lamp resistance already in circuit, the connection taking place preferably at the potential required for charging the batteries, which potential will be reduced by means of the lamp resistance to the potential required for operating the lamps. The connection may occur, however, at a slightly lower pressure, which will be immediately raised to the battery-charging pressure as the load is assumed by the machine. I then transfer the point of connection of the battery from the lamp side of the said resistance to the dynamo side thereof, and I preferably accomplish this more or less gradually by means of a modifying resistance.

Referring to the elementary diagrams shown in Figs. 2 and 3, A is the dynamo; C, the storage battery; B', the lamps; R', the lamp resistance; R³, the battery resistance, and D the switch for connecting the dynamo to the circuit when its speed reaches a point that will give the required potential. In Fig. 2 the battery C is supplying the lamps B', the dynamo being disconnected. In Fig. 3 the dynamo is connected to the circuit, the switch D being closed, and the battery-terminal has been transferred from the lamp side of resistance R' to the dynamo side thereof. In this condition the dynamo is both operating the lamp and charging the battery, the dynamo-pressure being reduced at the lamps by the resistance R'. The change from one condition to the other is accomplished by first closing the switch D and then transferring the battery connection through the graduating resistance R³. A practical embodiment of the elementary methods indicated in Figs. 2 and 3 is illustrated diagrammatically in Fig. 1.

In Fig. 1, as in Figs. 2 and 3, A is a dynamo, which is supposed to be driven by an intermittent and variable motive agency, such as a car-axle. C is a storage-battery, and B' B² are groups of incandescent lamps arranged at suitable points for illumination. Assuming that seventy volts is required at the dynamo for charging the battery C, while the lamps require but sixty volts, I provide that the dynamo will when fully in operation be connected directly to the battery C, but be connected to the lamps through the resistances R' and R², which will reduce the dynamo-potentials to sixty volts, or thereabout, for the lamps. D is the switch in the main circuit of the dynamo, which is to be closed and opened automatically, dependent upon the electromotive force of the dynamo. As in my former system, the switch D is preferably operated by the regulating-rheostat, which in turn is driven by a small motor G, controlled by a potential-magnet $E^2$. Said potential-magnet has an armature-core R, supported at one end by a link $r$ and at the other end by the arm $X'$ of an angle-lever whose opposite arm $X^2$ carries a contact $K^3$, connected by the wire $p$ to one side of the circuit. The contact $K^3$ vibrates between similar contacts $K^2$ $K^4$, the former being connected through the field-magnet $g^2$ of the motor G, which starts the motor in a direction to run the rheostat "on," and the latter being connected (through contact $K'$) with the reversely-wound field-magnet coil $g'$ of the said motor, which starts the motor in the opposite direction, so as to turn the rheostat-arm "off" from its contacts. M is the rheostat-arm, which is supposed to be mounted on a wheel driven by a screw on the shaft of motor G. On the same wheel is a pin W, which, as shown in the drawings, normally holds the switch D open by pressing on one arm of the angle-lever which carries the movable contact of the said switch.

Considering the operation of the apparatus as thus far described, the magnet $E^2$ will become energized when the potential of the dynamo due to its speed at starting reaches the required value. In this case it will be of the value necessary for charging the battery C—say seventy volts. The magnet will then draw the core R to the right, throwing the vibrating contact $K^3$ into connection with the contact $K^2$, thereby closing the circuit of motor G through the field-magnet $g^2$. The motor will then start in a direction to bring the pin W out of engagement with the angle-lever of the switch D and allow the switch to close.

Previous to the starting of the dynamo and the closure of the switch just described it is to be assumed that the lamps, if any are turned on, are operated, as aforesaid, by the battery C. At this time the circuit of the battery will be from its terminal 2 to the lamps $B'$ and $B^2$, thence to the contacts $K^5$ and $K^6$, to the arm M, thence through the bearings of the arm and by the wire $c$ to the opposite terminal 1 of the battery. When, however, the switch D is thrown, the dynamo-current will be admitted to the lamps at the proper potential to operate them without any flickering. The circuit will be from the terminal 3 of the dynamo to the switch D, thence by the wire $d$ to the lamps $B'$ $B^2$, to the contacts $K^5$ and $K^6$, and thence by the wires $f'$ and $f^2$ to the resistances $R'$ and $R^2$, respectively, and thence to the opposite terminal 4 of the dynamo. The resistances $R'$ and $R^2$ will reduce the potential of the machine from seventy to sixty volts, as required by the lamps. It will be understood that with the closure of the switch D by the movement of the rheostat the arm M will pass out of engagement with the contacts $K^5$ and $K^6$, thereby interrupting the direct connection of the battery to the lamps by the route above described, so that the load of lamps is transferred from the battery to the dynamo, and this is accomplished without any flickering of the lamps by reason of the adaptation thereto of the dynamo-potential, as above described. It remains, however, to connect the battery to the dynamo ahead of the resistances $R'$ $R^2$, so that it will receive the full dynamo-pressure of seventy volts. To this end the rear end of the arm M, which, it will be remembered, is connected to the wire $c$, leading to terminal 1 of the battery, is caused to come into engagement with the left-hand terminal of the rheostat $R^3$ simultaneously with the departure of the other end of the arm from the contacts $K^5$ and $K^6$. This brings the battery into direct connection with the dynamo, but with the resistance $R^3$ included in the circuit between them, so that the transfer may be made gradually. The circuit is from the dynamo-terminal 3 through the switch D and by the wire $d$ to the point 5, whence, as before described, one branch goes to the lamps $B'$ $B^2$, while another branch goes to the terminal 2 of the battery and after passing through the battery goes by the wire $c$ to the arm M, to the resistance $R^3$, to the ring S, thence by wire $e$ to the coil $E^3$, and by a continuation of the wire $e$ to the opposite terminal 4 of the dynamo. The resistance $R^3$ will be cut out as the rheostat continues to turn until the arm M rests directly upon the ring S, and the dynamo then feeds the battery directly at the normal charging pressure. When the train stops and its speed is so reduced that the potential of the dynamo falls below the point required for charging the battery, then the reverse operations take place—that is, the arm M returns to the position shown in the drawings, thereby introducing the resistance $R^3$ into the battery-circuit until finally when the switch D is opened it comes into engagement with the contacts $K^5$ and $K^6$ and connects the battery directly to the lamps.

The foregoing describes the feature of improvement which it is desired to embrace by the present patent, and the remainder of the apparatus shown is that found in my prior system, upon which the present invention constitutes an improvement, it being understood, however, that I do not make any claim thereto in the present application, but simply illustrate it as the fundamental device to which my present improvement is applied.

Briefly, the system provides that after the switch D has been connected a further increase of dynamo-speed, tending to increase the potential above the point at which the switch D was closed, causes the coil $E^2$ to draw the core R inward to the right, and thereby energize the motor G and cause it to work the rheostat in the on direction, which not only performs the operation I have already described, but in addition serves to introduce the resistance F into the field-magnet circuit of the dynamo to thereby decrease the field-magnet strength as the speed of the machine increases, and so prevent any rise of pressure above the normal point desired. Thus in the condition shown in the drawings the field-magnet circuit of the dynamo starts from the terminal 3, thence after passing through the field-magnet coils goes by the wire $h$ to the contact-point $h'$ of the rheostat F and also continues to the contact-point $h^2$, upon which rests the upper end of the arm M. From the arm M the field-magnet circuit goes by the route already described—viz., through the wires $f'$ and $f^2$ and the resistances $R'$ and $R^2$ to the terminal 4 of the dynamo. In this condition the field-magnet circuit contains none of the resistance F. When, however, the arm M begins to move, it comes into contact with the rheostat-contact $h'$, and as it continues to turn it passes from one contact-point to another of the rheostat, and thereby introduces one section after another of the resistance F into the field-magnet circuit between the first rheostat-contact $h'$ and the arm M. Thus any rise of potential above the normal causes the motor G in the manner aforesaid to turn the rheostat one or more steps to introduce additional resistance into the field-magnet circuit. So long as the potential is normal, as is indicated by the potential-magnet $E^2$, then the contact $K^3$, controlled by the said magnet, stands midway between the contacts $K^2$ and $K^4$ and the motor G is at a standstill. On the other hand, when the potential falls below the said normal point the potential-coil $E^2$ is weakened, its core R is drawn to the left by the retractile spring, and the contact $K^3$ comes into engagement with the contact $K^4$. This causes the motor in the manner already described to rotate in the opposite direction, and thereby turn the rheostat to cut more or less of the resistance F out of the field-magnet circuit, and so increase the field strength of the dynamo. The motor G is also arranged to be operated by the storage battery C, so that in the event of any external interruption of the dynamo-current by the blowing of a fuse or other contingency the battery will continue to operate the motor to bring the rheostat back to its off condition shown in the drawings. The motor-circuit starts from the wire $c$, referred to above as connected to the terminal 1 of the battery, and passes thence by the wire $k$ to the centrifugal governor H, which serves to open the motor-circuit when its speed becomes too great, and thereafter passing through the armature of the motor goes through one or the other of the two field-magnet coils $g'$ $g^2$ to contacts $K^4$ or $K^2$, respectively. In order that the motor-circuit may be ultimately broken when the parts come to rest, so that the battery may not continue to leak through the motor-circuit, and so lose its charge, I provide the contact $K'$, which, except in the off condition, rests against the contact $K^4$, the latter being mounted on one arm $Q^2$ of an angle-lever whose opposite arm $Q'$ is also engaged by the pin W aforesaid, and when the parts come to their off condition is thereby moved against the force of the operating-spring $T^2$ to break the connection between $K'$ and $K^4$. This interrupts the off circuit of motor G, although leaving the on circuit ready to be energized when the dynamo again starts. Such starting of the dynamo will, as described above, also start the rheostat when the required potential is reached, and thereby move the pin W, so as to allow the contacts $K'$ and $K^4$ to come together. I also prefer to use, although it is not necessary to do so, the magnet-coil $E^3$, comprising a few turns of coarse wire in the branch circuit leading to the battery and in series therewith, together with means for adjusting the tension of the retractile spring T of the magnet. Similar features have been shown in my prior system, but have been there used for a somewhat different function, although the coil $E^3$ in the present arrangement still has the function of preventing an excessive flow of current to the battery if the full charging potential should be applied thereto when in a depleted condition. In the present case it will be observed that the storage battery is introduced into the circuit somewhat gradually through the resistance $R^3$, and it is my purpose to prevent the coil $E^3$, which is so wound as to cooperate with the potential-coil $E^2$, from affecting the potential-determining effect of the coil $E^2$ so long as the current flowing from the battery is only of the normal amount. To this end I provide for increasing the tension of the retractile spring T as the battery-current admitted thereto through the coil $E^3$ increases up to the normal amount. To accomplish this, the spring T is anchored at its outer end to one end of an angle-lever whose opposite end bears on a cam $S^2$ on the shaft of the rheostat-arm M. Assuming, as above described, that the apparatus starts at seventy volts, there being at that time no load on the dynamo, then the cam $S^2$ will act upon the angle-lever to increase the tension of the spring T while the arm M is passing over the rheostat $R^3$. This will insure the maintenance of the potential at seventy volts in spite of such current as will flow through the series coil $E^3$ as the load is taken up by the dynamo. In my former apparatus a similar adjustment was employed; but in that case it was for the purpose of allowing the apparatus to start at sixty volts and gradually rise to seventy. In the present case the apparatus starts at seventy and the adjustment tends to retain it at that figure or at any other figure which may be selected as the normal one for charging the battery. The adjustment ceases after the battery is all cut in, the normal current then flowing thereto, and thereafter the tendency to an increase of voltage by reason of an increase of speed is counteracted by the introduction of the field-magnet resistance F. Both the series coil E³ and the described means of adjustment may be omitted, if desired, the spring T then being attached to a fixed anchorage. The adjustment may also be used without the series coil E³ and so arranged that the magnet will start into action a trifle in advance and then bring the dynamo up to full voltage gradually as the load comes on, and the same may be done even if the coil E³ is present, although there is no such change of pressure and adaptation of lamp resistance thereto as occurs in my prior systems.

It should be mentioned that in the arrangement above described it becomes unnecessary to graduate the lamp resistances, which is a matter of importance, not only because it avoids a multiplicity of resistance-contacts, with a consequent simplifying of the construction, but also because it does away with the fine adjustment required to operate graduated lamp resistances in response to pressure changes without producing fluctuations in the lamps. Moreover, quite apart from the matter of the particular potential at which the dynamo is connected up it is an important advantage to first connect the dynamo to the circuit through the lamp resistance and then to transfer the battery-terminal from the lamp side of the said resistance to the dynamo side, as distinguished from prior methods which first connect the dynamo to the circuit and then bring the lamp resistance into circuit. It avoids the graduation of the resistance, as above described, and the necessity of introducing the resistance into the lamp-circuit at a rate corresponding with the rise of the dynamo-pressure subsequent to its connection with the circuit. If the dynamo and resistance are connected to the circuit while the batteries are still feeding the lamps, it will be evident that there will be no change in the lamps so long as the dynamo-pressure is not low enough to create a serious draft on the battery through the circuit (in multiple with the lamps) formed by the dynamo and resistance nor high enough to create at the lamps a pressure in excess of that supplied to the lamps by the battery. The pressure at which the dynamo is connected need not therefore be very exact, although I prefer, as aforesaid, to connect up the dynamo at approximately the pressure required for charging the batteries, which will be reduced by means of the lamp resistance to the pressure required for operating the lamps.

What I claim is new, and desire to secure by Letters Patent, is—

1. In an electric-lighting system the combination with a variable-speed dynamo of electric lamps and a storage battery, an automatic connection-switch for the dynamo operating at a higher potential than is required for the lamps, a resistance in the lamp-circuit and a switch for transferring the battery from the lamp-circuit to the dynamo-circuit ahead of the said lamp resistance.

2. In an electric-lighting system the combination with a variable-speed dynamo of electric lamps and a storage battery, an automatic connection-switch for the dynamo operating at a higher potential than is required for the lamps, a potential-reducing device in the lamp-circuit and means for gradually transferring the battery from the lamp-circuit to the dynamo-circuit ahead of the said potential-reducing device.

3. In an electric-lighting system the combination with a variable-speed dynamo of electric lamps and a storage battery, an automatic connection-switch for the dynamo operating at a higher potential than is required for the lamps, a resistance in the lamp-circuit, a switch for connecting the battery to the lamp-circuit on the lamp side of the said resistance and means for transferring the battery from the lamp-circuit to the dynamo-circuit at a point between the dynamo and the said resistance.

4. In an electric-lighting system, the combination with a variable-speed dynamo of electric lamps and a storage battery, an automatic connection-switch for the dynamo operated at a higher potential than is required for the lamps, a potential-reducing device in the lamp-circuit, a switch for connecting the battery to the lamp-circuit on the lamp side of the said resistance when the automatic connection-switch is open, an automatic circuit-changer acting upon the closure of the said connection-switch to transfer the battery from the lamp-circuit to the dynamo-circuit at a point between the dynamo and the lamp resistance, and a regulator for the dynamo to prevent the increase of potential therefrom above the point required for charging the battery as the speed of the dynamo increases.

5. In an electric-lighting system, the combination with a variable-speed dynamo of electric lamps and a storage battery, an automatic connection-switch for the dynamo operating at a higher potential than is required for the lamps, a potential-magnet connected with the dynamo-terminals, a regulator controlled thereby, a coil in the branch circuit leading to the battery and acting upon the said potential-magnet, and an adjusting device for the potential-coil for neutralizing the effect thereon of the said series coil so long as the battery-current in said coil is normal.

6. In an electric-lighting system, the combination with a variable-speed dynamo of electric lamps and a storage battery, an automatic connection-switch for the dynamo operating at a higher potential than is required for the lamps, a potential-magnet controlling the said connection-switch and a regulator for the dynamo to prevent an increase of potential therefrom above the point required for charging the battery as the speed of the dynamo increases.

7. In an electric-lighting system, the combination with a variable-speed dynamo, of electric lamps and a storage battery, a potential-reducing device in the lamp-circuit, an automatic connection-switch for the dynamo operating at a higher potential than is required for the lamps, a switch for connecting the battery to the lamp-circuit between the lamps and the said potential-reducing device when the said connection-switch is open, and to the dynamo-circuit at a point between the dynamo and the potential-reducing device when the said connection-switch is closed, and a regulator for preventing an increase of dynamo-pressure above the point required for charging the battery as the speed of the dynamo increases.

8. In an electric-lighting system, the combination with a variable-speed dynamo, of electric lamps and a storage battery, a connection-switch for the dynamo operating at a higher potential than is required for the lamps, a regulator for the dynamo, a potential-magnet for controlling the said regulator, a modifying-coil in series with the battery and an adjusting device for the retractor of the regulator-magnet dependent upon the admission of current to the battery.

9. In an electric-lighting system, the combination with a variable-speed dynamo, of electric lamps and a storage battery, an automatic connection-switch for the dynamo operating at a higher potential than is required for the lamps, a resistance in the lamp-circuit, a switch for connecting the battery to the lamps outside of the lamp resistance when the said connection-switch is open and for connecting the battery to the dynamo outside of the said lamp resistance when the said connection-switch is closed and a battery resistance normally excluded from the battery-circuit, but adapted to be included therein when the battery connection is changed from the lamp-circuit to the dynamo-circuit.

10. In an electric-lighting system, the combination with a variable-speed dynamo, of electric lamps and a storage battery, an automatic connection-switch for the dynamo operating at a higher potential than is required for the lamps, an ungraduated lamp resistance and a switch for connecting the battery to the lamp-circuit on one side of said resistance when the connection-switch is open and to the dynamo-circuit on the other side of said resistance when the said connection-switch is closed.

11. In an electric-lighting system, the combination with a variable-speed dynamo, of electric lamps and a storage battery, an automatic connection-switch for the dynamo operating at a higher potential than is required for the lamps, circuit-changing devices for the battery for connecting it to the lamps or to the dynamo outside of the said resistance, and a regulator for the dynamo for preventing an increase of its potential above the point aforesaid as its speed increases.

12. In an electric-lighting system, the combination with a variable-speed dynamo of electric lamps and a storage battery, an electric motor, a potential-magnet set to operate at a higher potential than is required for the lamps and mechanism operated by the said motor comprising a connection-switch for the dynamo, a regulating-rheostat for the dynamo and a switch for connecting the battery to the lamps or to the dynamo outside of the lamp resistance.

13. In an electric-lighting system, the combination with a variable-speed dynamo of electric lamps and a storage battery, an automatic connection-switch for the dynamo operating at a higher pressure than is required for the lamps, a lamp resistance, a regulating resistance for the dynamo, an electric motor and a potential-magnet controlling the said motor.

14. In an electric-lighting system, the combination with a variable-speed dynamo, of electric lamps and a storage battery, an automatic connection-switch for the dynamo, a lamp resistance, a regulating resistance for the dynamo, a battery resistance, an electric motor controlling the three resistances aforesaid and a magnet controlling the said motor.

15. In an electric-lighting system, the combination with a variable-speed dynamo, of electric lamps and a storage battery, a resistance, an automatic connection-switch for connecting the lamps and battery to the dynamo in multiple with each other and in series with the resistance and means for transferring the connection of the battery around the said resistance to a point between it and the dynamo.

16. In an electric-lighting system, the combination with a variable-speed dynamo of electric lamps and a storage battery, connected in series with each other, a resistance, an automatic switch for connecting the dynamo and the said resistance in series to the lamp and battery circuit at a point between the lamps and the battery, and an automatic circuit-changer for subsequently transferring the battery connections around the said resistance to a point between it and the dynamo.

17. In an electric-lighting system, the combination with a variable-speed dynamo of electric lamps and a storage battery, an automatic switch for connecting the dynamo and resistance in series to the lamp and battery circuits, a magnet, a motor controlled by said magnet and circuit-changing devices operated by the said motor for transferring the battery connection around said resistance to a point between it and the dynamo.

18. In an electric-lighting system, the combination with a variable-speed dynamo of electric lamps and a storage battery, a resistance, an automatic switch for connecting the dynamo and resistance in series to the lamp and battery circuit, a magnet, switching devices controlled by the said magnet for transferring the said battery connection around the said resistance to a point between it and the dynamo and automatic adjusting devices for said magnet.

19. In an electric-lighting system, the combination with a variable-speed dynamo of lamps and storage batteries, a lamp resistance, an automatic switch for connecting the dynamo and resistance in series to the lamp and battery circuit, a battery resistance and a switch for transferring the battery connection through the said battery resistance to a point between the said lamp resistance and the dynamo.

20. In an electric-lighting system, the combination with a variable-speed dynamo, of lamps and a storage battery, an automatic connection-switch, a regulator, a lamp resistance in series with both the battery and lamps and a transfer-switch for changing the battery connection around the lamp resistance to a point between it and the dynamo.

In witness whereof I have hereunto set my hand, before two subscribing witnesses, this 14th day of February, 1902.

JAMES F. McELROY.

Witnesses:
SAMUEL J. SMITH,
ERNEST D. JANSEN.